Dec. 1, 1959  R. P. JACOBSON  2,915,220
DEVICE FOR MEASURING GAS
Filed Sept. 16, 1957

INVENTOR.
Rollyn P. Jacobson
BY
Adams, Forward and McLean
ATTORNEYS

United States Patent Office 2,915,220
Patented Dec. 1, 1959

2,915,220

DEVICE FOR MEASURING GAS

Rollyn P. Jacobson, Tulsa, Okla., assignor to Sinclair Oil & Gas Company, Tulsa, Okla., a corporation of Maine Application September 16, 1957, Serial No. 684,361

3 Claims. (Cl. 222—3)

This invention relates to the measurement of standardized amounts of gaseous materials and in particular provides a device for precise measurement of small amounts of a gas to be introduced into a gas analysis system.

In gas chromatography, as is well-known, a mixture of higher boiling gases in a carrier gas, such as helium, hydrogen or nitrogen, is passed through a selective adsorbent which separates the mixture of unknown gases into their various constituents such that the exit gas includes the pure carrier gas with intermittent slugs of the separated components of the unknown gaseous mixture. These slugs can, of course, be detected by thermal conductivity or similar measurements. It is necessary, however, in order to standardize gas chromatographic analysis equipment to pass through the equipment samples in known amounts of known gases which are subsequently to be detected in unknown mixtures. Thus when an unknown gas mixture is passed through the equipment the composition and quantity of the various components of the unknown mixture can be identified by relation to the prior standardization. It is also necessary to introduce the unknown gas in absolutely measured amounts or in amounts which can be related to an absolute quantity in order to provide accurate comparison with the standards which are set for each particular apparatus. The measurement of any gas in small amounts which can be equated to an absolute amount is, however, extremely difficult since minor temperature and pressure changes invariably complicate the difficulty of trapping an exact weight of gas.

It is the primary object of this invention to provide a device for entrapping gaseous materials in small amounts which can be related to an absolute measurement and then can be delivered to or introduced into any desired system, for example a system for analyzing gaseous mixtures by gas chromatography.

It is also an important object of this invention to provide such a device from which small samples repeatedly can be entrapped from a larger volume of gas with consistent relationship between the absolute quantities of such samples despite variation in environmental temperature and pressure.

It is still another object of this invention to provide a gas receiver which can be readily connected and disconnected from gas analysis equipment for introducing measured amounts of gases into the gas analysis equipment and which can readily be interchanged with similar vessels containing other gases similarly to be introduced into the gas analysis equipment.

These and other objects of this invention are essentially obtained by providing a vessel for completely enclosing a volume of gas into which there depends a tube externally arranged at its upper, external end for a connection into the gas analysis equipment through a two-way valve. The alternate position of the valve connects the tube to the interior of the vessel at a location above the lower end of the tube. The lower end of the vessel is externally connected through a flexible conduit to the lower end of a second closed vessel.

For a more complete understanding of the practical applications of this invention reference is made to the appended drawings in which.

Figure 1:
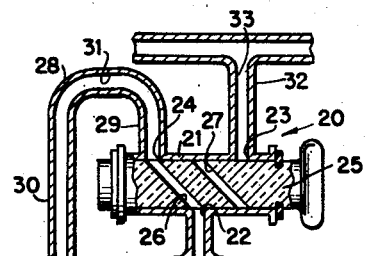
Figure 1 is a partially sectioned view of the gas measuring device of this invention shown attached to a fragment of a gas analysis device.

In the drawings the reference numeral 10 designates the gas measuring device of this invention. Gas measuring device 10 broadly includes a gas receiver 11, a liquid level adjustor 12 and a gas measuring tube 13.

Gas receiver 11 is a closed, spherical vessel constructed of glass, or similar transparent, rigid, non-permeable material, which at its lower end is provided with a fitting 14. Liquid level adjusting device 12 is similarly a closed, spherical vessel constructed of glass and is similarly provided at its lower end with a fitting 15. Fittings 14 and 15 are respectively provided with ports 16 and 17 communicating, respectively, with the interiors A and B of gas receiver 11 and liquid level adjustor 12. A flexible piece of plastic hose 18 is connected at one end over fitting 14 and at the other end over fitting 15 thus communicating interiors A and B of receiver 11 and level adjustor 12.

Measuring tube 13 preferably is constructed of glass or similar transparent material integrally with gas receiver 11 and extends through the upper end of receiver 11 in which it is affixed such that bore 19 of tube 13 permits external communication with the interior of receiver 11. The lower end of tube 13 is cut on a bevel as indicated in the drawings to facilitate accurate entrapment of gas in bore 19 as will be later explained and extends downwardly into interior section A of receiver 11 preferably below the center of receiver 11.

The upper end of tube 13 as it extends beyond the upper end of gas receiver 11 is connected to a two-way stop cock 20 having a horizontally positioned cylindrical barrel 21 constructed of glass or similar material and provided with three ports 22, 23 and 24. Port 22 is located on the underside of barrel 21, and ports 23 and 24 are positioned on the upper side of barrel 21 offset equally toward opposite ends of barrel 21 from port 22. The upper end of tube 13 is affixed to barrel 21 with bore 19 communicating with port 22. A rotary plug 25 tightly received in barrel 21 and constructed of glass or similar material is provided with a pair of parallel inclined passageways 26 and 27. In one angular position of plug 25 relative to barrel 21 the opposite ends of passageway 27 register with ports 22 and 23 and in another position, preferably 180° from the first position, the opposite ends of passageway 26 register with ports 24 and 22.

An inverted glass U-tube 28 having a short leg 29 and a long leg 30 is mounted on receiver 11 and stop cock 20 with the short leg 29 attached to barrel 21 such that the bore 31 of U-tube communicates with port 24. The long leg 30 of U-tube 28 is affixed in the wall of receiver 11 at a location above the lower end of tube 13 with bore 31 communicating with the interior A of receiver 11.

Barrel 21 of stop cock 20 is suitably attached to a T-connection 32 located in the gas analysis equipment to which device 10 is to be connected with port 23 communicating with the interior 33 of connection 32.

In employing the measuring device of this invention a small quantity of mercury or similar liquid which is immiscible and non-reactive with any gas that may be employed is introduced into receiver 11 and liquid level adjustor 12 filling the lower portions of spaces A and B and filling hose 18. The gas thus entrapped in the upper portion of space B in adjustor 12 is preferably a sample of the same gas to be measured by the equipment. The amount of mercury should be such that by vertical movement of adjustor 12 the level of mercury in receiver 11 can be lowered beneath the lower end of tube 13 or raised up to cover the lower end of tube 13.

Figure 3:
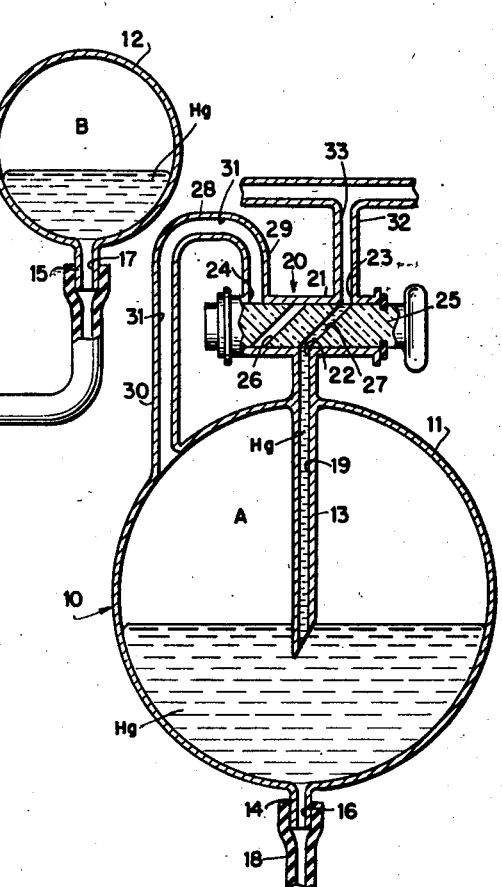
Figure 3 is a view similar to Figure 2 illustrating still another position of the device of this invention.

With stop cock 20 then adjusted by rotating plug 25 to communicate the interior 19 of tube 13 through passage 27 with the interior 33 of T-connection 32 the portion of the interior A of receiver 11 above the mercury level is then evacuated, adjustor 12 being dropped to hold the level of mercury in space A below the lower end of tube 13. The gas which is to be subsequently delivered in measured amounts is then introduced into T-connection 32 and passed into the upper portion of interior A of receiver 11. Liquid level adjustor 12 is then raised to bring the level of mercury to a point just closing off the bore 19 of tube 13 from the gas contained in interior A of receiver 11. Adjustor 12 is then carefully raised an additional amount to cause the mercury in receiver 11 to rise through bore 19 up into the stem of T-connection 32 which is connected to port 23 thus filling passage 27 with mercury (see Figure 3).

Plug 25 is then rotated 180° to disconnect passage 27 from communication with ports 22 and 23 and to connect passage 26 in communication with ports 22 and 24 equalizing the pressure on the upper surface on the pool of mercury retained in bore 19 and the pool of mercury retained in receiver 11 thus dropping the column of mercury in bore 19 into the pool in receiver 11 (see Figure 1).

Figure 2:
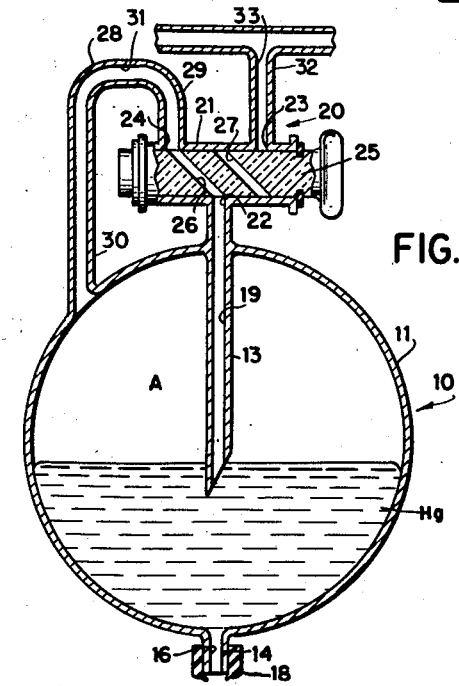
Figure 2 is a fragmentary view similar to Figure 1 showing a different position of the device shown in Figure 1.

Thereafter when it is desired to introduce a measured sample of the gas retained in interior A of receiver 11 into the analysis system of which T-connection 32 is a part liquid level adjustor B is adjusted to bring the pool of mercury in receiver 11 to a position with its upper surface just closing the lower end of tube 13 (see Figure 2). Stop cock plug 25 is then rotated a quarter of a turn to disconnect passageway 26 from ports 24 and 22. This entraps in bore 19 between plug 25 and the level of mercury in receiver 11 a volume of the gas in space A which is a fixed fraction of the total volume of gas entrapped in receiver 11 and which, regardless of environmental variations in temperature and pressure, contains a number of molecules of gas which bears the same fixed relation to the total number of molecules of gas in receiver 11. Stop cock plug 25 is then rotated another quarter turn to align passageway 27 with ports 22 and 23 thus communicating bore 19 with the interior 33 of T-connection 22. The small slug of mercury which was previously retained in passageway 27 will, of course, drop into bore 19 but will not affect the total number of molecules entrapped in bore 19 which thereupon are introduced into the system of which T-connection 32 is a part by raising liquid level adjustor 12 to force a column of mercury up into bore 19 through passageway 27 and into interior 33 of the depending stem of T-connection 32 carrying the entrapped volume of gas into the analysis system. Stop cock plug 25 is then reversed disconnecting passageway 27 and reconnecting passageway 26 with ports 22 and 24 to drop the column of mercury in tube 13 to ready the device for delivering an additional sample of gas into the analysis equipment.

It will be evident that the total molecules of gas entrapped in receiver 11 is decreased with the delivery of each additional sample. However since the delivered portion always bears the same fixed ratio to the total molecules of gas in receiver 11 the absolute quantity of gas delivered with each succeeding sample delivery will fall along a pre-calculable curve which can be determined by a knowledge of the volume of receiver 11 above the level of mercury and the volume of bore 19. These can be measured by obvious methods. For most purposes, however, knowledge of the absolute volume delivered is not necessary and for each specific measuring device a curve of the decreasing quantities of gas delivered can be constructed by delivering repeatedly a series of samples of the same gas into the same analysis equipment and observing the gradual decline in reading of the gas chromatograph. Desirably the volume of the receiver should be about 1,000 times the volume of the tube as this will permit as many as 100 samples to be measured from a given gas sample in receiver 11 with less than a 10% decline in the absolute amount of gas delivered with each sample.

It will be evident from the preceding description that the measuring device of this invention is practically independent of temperature changes as the volume of the gas when the sample is trapped is a constant and hence the number of molecules per unit volume will be independent of environmental temperature. A negligible error will, of course, be present due to change of temperature in the glassware, solution of gas in mercury and adsorption of gas on the glassware. Environmental pressure changes are completely eliminated since the system is entirely closed to the atmosphere.

I claim:

1. A device for measuring and delivering discrete quantities of a gas which includes a closed receiver, a tube affixed in the upper end of said receiver and depending thereinto, first means closed from the atmosphere connected to the lower end of said receiver and movable relative thereto for raising and lowering a pool of liquid in the lower end of said receiver, a second means connected to the upper end of said tube having a first position communicating the interior of said tube with a system into which gas is to be delivered and a second position communicating the upper end of said tube with the interior of said receiver at a location in said receiver above the lower end of said tube.

2. A device according to claim 1 in which said first means includes a second closed receiver and a flexible conduit connected to the lower end of said first named receiver and to the lower end of said second receiver to communicate the interiors of said receivers.

3. A device according to claim 1 in which said second means includes a two-way valve and a second tube connected at one end to said valve and at the other end to the interior of said first named receiver at a position above the lower end of said first named tube to communicate the upper end of said first named tube in one position of said valve to the upper interior of said receiver through said second tube.

References Cited in the file of this patent

UNITED STATES PATENTS

| | | |
|---|---|---|
| 2,267,594 | Lowry et al. | Dec. 23, 1941 |
| 2,501,461 | Wirth | Mar. 21, 1950 |